(12) United States Patent
Lonkar et al.

(10) Patent No.: US 11,577,843 B2
(45) Date of Patent: Feb. 14, 2023

(54) THERMAL ANTI-ICING SYSTEM WITH NON-CIRCULAR PICCOLO TUBE

(71) Applicant: Rohr, Inc., Chula Vista, CA (US)

(72) Inventors: Vinod Lonkar, Bangalore (IN); Venkatarao Para, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 171 days.

(21) Appl. No.: 17/089,304

(22) Filed: Nov. 4, 2020

(65) Prior Publication Data

US 2021/0129996 A1    May 6, 2021

(30) Foreign Application Priority Data

Nov. 5, 2019  (IN) .............................. 201911044876

(51) Int. Cl.
 *B64D 15/04* (2006.01)
 *F01D 25/02* (2006.01)
 *F02C 7/047* (2006.01)

(52) U.S. Cl.
 CPC .............. *B64D 15/04* (2013.01); *F01D 25/02* (2013.01); *F02C 7/047* (2013.01); *F05D 2250/14* (2013.01); *F05D 2260/201* (2013.01)

(58) Field of Classification Search
 CPC ........ B64D 15/00; B64D 15/02; B64D 15/04; B64D 2033/0233; F01D 25/02; F02C 7/047; F05D 2250/14; F05D 2260/201
 See application file for complete search history.

(56) References Cited

U.S. PATENT DOCUMENTS

| 5,011,098 A | * | 4/1991 | McLaren | B64D 27/14 244/134 B |
| 5,841,079 A | * | 11/1998 | Parente | F02C 7/047 244/134 B |
| 8,100,364 B2 | | 1/2012 | Nieman | |
| 8,678,319 B2 | * | 3/2014 | Todorovic | B64D 33/02 244/134 B |
| 2008/0159852 A1 | | 7/2008 | Stephenson | |
| 2010/0176243 A1 | | 7/2010 | Nieman | |
| 2013/0263601 A1 | | 10/2013 | Richardson | |

(Continued)

FOREIGN PATENT DOCUMENTS

EP           913326 A    5/1999

OTHER PUBLICATIONS

Goldstein et al., "Streamwise distribution of the recovery factor and the local heat transfer coefficient to an impinging circular air jet", International Journal of Heat and Mass Transfer, vol. 29, No. 8. pp. 1227-1235, 1986.

(Continued)

*Primary Examiner* — Courtney D Heinle
*Assistant Examiner* — Danielle M. Christensen
(74) *Attorney, Agent, or Firm* — Getz Balich LLC

(57) ABSTRACT

A system is provided for an aircraft propulsion system. This system includes an inlet lip, a bulkhead and a piccolo tube for a thermal anti-icing system. The inlet lip extends circumferentially about an axial centerline. The bulkhead extends circumferentially about the axial centerline. The bulkhead is configured with the inlet lip to form a cavity axially between the inlet lip and the bulkhead. The piccolo tube extends circumferentially about the axial centerline within the cavity. The piccolo tube is configured with an elliptical cross-sectional geometry.

12 Claims, 10 Drawing Sheets

(56) References Cited

U.S. PATENT DOCUMENTS

| | | |
|---|---|---|
| 2015/0377132 A1 | 12/2015 | Caruel |
| 2016/0257418 A1 | 9/2016 | Caruel |
| 2017/0008635 A1 | 1/2017 | Mackin |
| 2017/0058772 A1 | 3/2017 | Frank |
| 2017/0217593 A1 | 8/2017 | Ishida |
| 2017/0233084 A1 | 8/2017 | Ichikawa |
| 2018/0079521 A1 | 3/2018 | Jackowski |
| 2020/0122843 A1* | 4/2020 | Porte ................ B64D 33/02 |

OTHER PUBLICATIONS

EP search report for EP20206009.1 dated Mar. 17, 2021.

* cited by examiner

THERMAL ANTI-ICING SYSTEM WITH NON-CIRCULAR PICCOLO TUBE

This application claims priority to Indian Patent Appln. No. 201911044876 filed Nov. 5, 2019, which is hereby incorporated herein by reference in its entirety.

BACKGROUND

1. Technical Field

This disclosure relates generally to an aircraft propulsion system and, more particularly, to a thermal anti-icing system with a piccolo tube.

2. Background Information

An aircraft propulsion system may include a thermal anti-icing system for removing and/or preventing accumulation of ice on a leading edge surface. Various types and configurations of such thermal anti-icing systems are known in the art. While these known thermal anti-icing systems have various advantages, there is still room in the art for improvement. There is a need in the art therefore for an improved thermal anti-icing system.

SUMMARY OF THE DISCLOSURE

According to an aspect of the present disclosure, a system is provided for an aircraft propulsion system. This system includes an inlet lip, a bulkhead and a piccolo tube for a thermal anti-icing system. The inlet lip extends circumferentially about an axial centerline. The bulkhead extends circumferentially about the axial centerline. The bulkhead is configured with the inlet lip to form a cavity axially between the inlet lip and the bulkhead. The piccolo tube extends circumferentially about the axial centerline within the cavity. The piccolo tube is configured with an elliptical cross-sectional geometry.

According to another aspect of the present disclosure, another system is provided for an aircraft propulsion system. This system includes an inlet lip and a thermal anti-icing system. The inlet lip extends circumferentially about an axial centerline. The thermal anti-icing system includes a piccolo tube. The piccolo tube is configured to direct air onto an interior surface of the inlet lip. The piccolo tube is configured with a non-circular cross-sectional geometry. The piccolo tube is completely separated from the inlet lip by an air gap.

According to still another aspect of the present disclosure, a thermal anti-icing system is provided for an aircraft system. This thermal anti-icing system includes a piccolo tube extending circumferentially about an axial centerline. The piccolo tube is configured with an elliptical cross-sectional geometry when viewed in a plane parallel with and coincident with the axial centerline. The piccolo tube includes a plurality of apertures configured to direct air, from within a bore of the piccolo tube, outward from the piccolo tube.

The non-circular cross-sectional geometry may be an elliptical cross-sectional geometry.

A major axis of the non-circular cross-sectional geometry may be angularly offset from the axial centerline by an acute angle.

The system may also include a bulkhead and a plurality of mounting brackets. The bulkhead may extend circumferentially about the axial centerline. The bulkhead may be attached to the inlet lip with a cavity extending axially between the inlet lip and the bulkhead. The mounting brackets may attach the piccolo tube to the bulkhead.

The non-circular cross-sectional geometry may have a major axis and a minor axis. A forward end of the major axis may have a first radius to the axial centerline. An aft end of the major axis may have a second radius to the axial centerline that is less than the first radius.

The piccolo tube may be configured with a first impingement aperture and a second impingement aperture axially aft of the first impingement aperture along the axial centerline. The first impingement aperture may be configured to direct a first portion of the air onto the interior surface of the inlet lip along a first trajectory. The second impingement aperture may be configured to direct a second portion of the air onto the interior surface of the inlet lip along a second trajectory. A first distance between the first impingement aperture and the inlet lip along the first trajectory may be within +/−10% a second distance between the second impingement aperture and the inlet lip along the second trajectory.

The piccolo tube may also be configured with a third impingement aperture axially between the first impingement aperture and the second impingement aperture along the axial centerline. The third impingement aperture may be configured to direct a third portion of the air onto the interior surface of the inlet lip along a third trajectory. A third distance between the third impingement aperture and the inlet lip along the third trajectory may be within +/−10% the second distance between the second impingement aperture and the inlet lip along the second trajectory.

The system may also include a mounting bracket attaching the piccolo tube to the bulkhead.

The piccolo tube may be completely separated from the inlet lip by a gap.

The elliptical cross-sectional geometry may have a major axis and a minor axis.

The major axis may be angularly offset from the axial centerline by an acute angle.

The major axis may be angularly offset from the axial centerline by an angle between one degree and forty-five degrees.

A forward end of the major axis may have a first radius to the axial centerline. An aft end of the major axis may have a second radius to the axial centerline that is less than the first radius.

A minimum distance between the piccolo tube and the inlet lip may be between 50-150% of the minor axis.

The major axis may be at least 50% of a maximum axial distance between the inlet lip and the bulkhead.

The piccolo tube may be configured with a plurality of impingement apertures configured to direct fluid from within the piccolo tube to impinge against the inlet lip.

A first set of the impingement apertures may be arranged in a first array. A second set of the impingement apertures may be arranged in a second array that is axially offset from the first array. A first of the impingement apertures in the first set may be circumferentially offset from each of the impingement apertures in the second set.

A first of the impingement apertures may be circumferentially aligned with and axially offset from a second of the impingement apertures.

The impingement apertures may include a first impingement aperture and a second impingement aperture axially aft of the first impingement aperture along the axial centerline. The first impingement aperture may be configured to direct a first portion of the fluid to impinge against the inlet lip along a first trajectory. The second impingement aperture may be configured to direct a second portion of the fluid to impinge against the inlet lip along a second trajectory. A first distance between the first impingement aperture and the inlet lip along the first trajectory may be within +/−5% a second distance between the second impingement aperture and the inlet lip along the second trajectory.

The impingement apertures may also include a third impingement aperture axially between the first impingement aperture and the second impingement aperture along the axial centerline. The third impingement aperture may be configured to direct a third portion of the fluid to impinge against the inlet lip along a third trajectory. A third distance between the third impingement aperture and the inlet lip along the third trajectory may be within +/−5% the second distance between the second impingement aperture and the inlet lip along the second trajectory.

The inlet lip may include an inner lip skin and an outer lip skin. The cavity may extend axially along the axial centerline between a forward end of the inlet lip and the bulkhead. The cavity may extend radially between the inner lip skin and the outer lip skin. The cavity may extend circumferentially about the axial centerline.

The foregoing features and the operation of the invention will become more apparent in light of the following description and the accompanying drawings.

DETAILED DESCRIPTION

Figure 1:
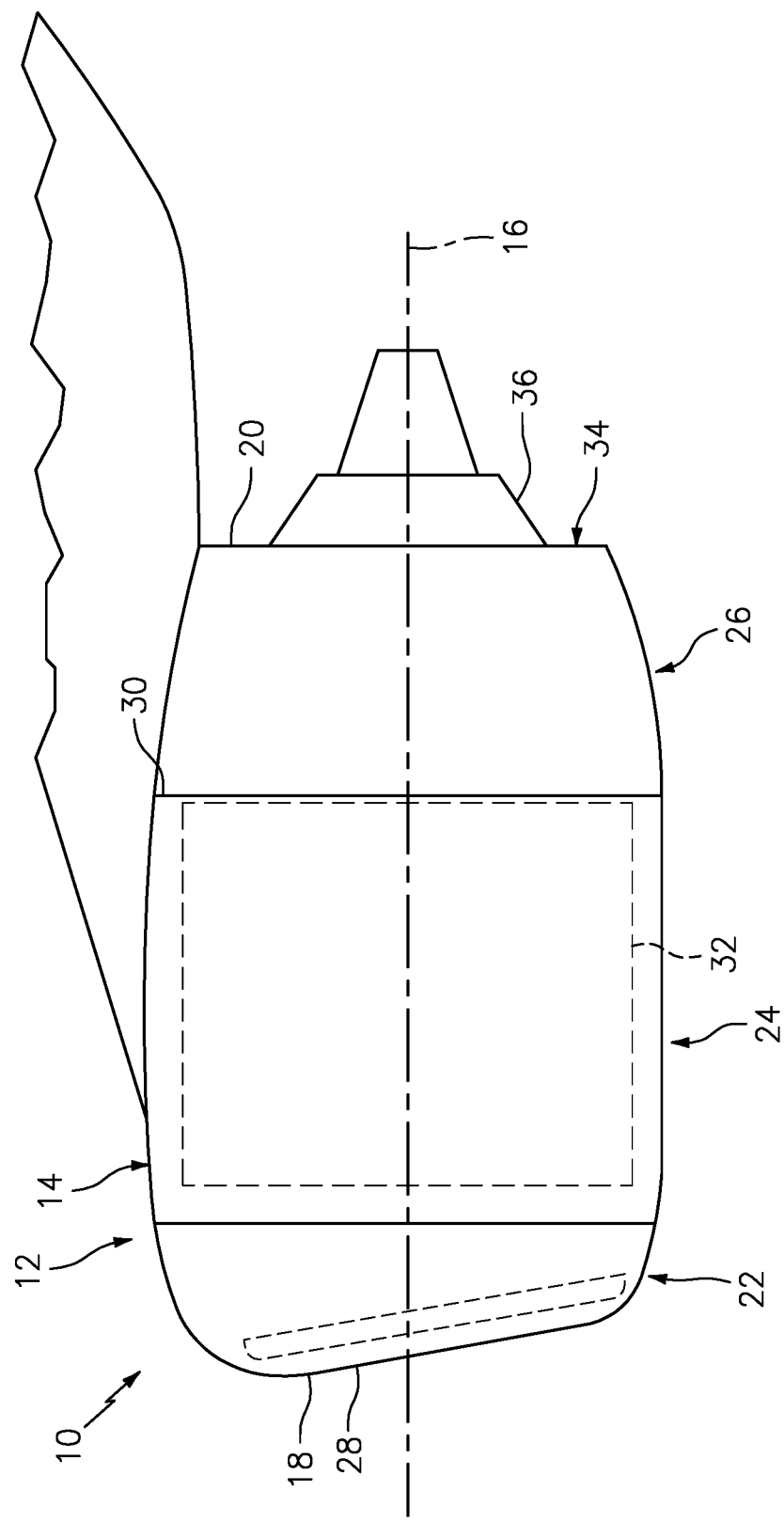
FIG. 1 is a side illustration of an aircraft propulsion system.

FIG. 1 illustrates an aircraft propulsion system 10 for an aircraft such as, but not limited to, a commercial airliner. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. An outer structure 14 of the nacelle 12 extends along an axial centerline 16 between a nacelle forward end 18 and a nacelle aft end 20. The nacelle 12 of FIG. 1 includes a nacelle inlet structure 22, one or more fan cowls 24 (one such cowl visible in FIG. 1) and a nacelle aft structure 26, which may be configured as part of or include a thrust reverser system.

As described below in further detail, the inlet structure 22 is disposed at the nacelle forward end 18. The inlet structure 22 is configured to direct a stream of air through an inlet opening 28 (see also FIG. 2) at the nacelle forward end 18 and into a fan section of the gas turbine engine.

The fan cowls 24 are disposed axially between the inlet structure 22 and the aft structure 26. Each fan cowl 24 of FIG. 1, in particular, is disposed at an aft end 30 of a stationary portion of the nacelle 12, and extends forward to the inlet structure 22. Each fan cowl 24 is generally axially aligned with a fan section of the gas turbine engine. The fan cowls 24 are configured to provide an aerodynamic covering for a fan case 32, which circumscribes the fan section and partially forms an outer peripheral boundary of a bypass flowpath of the propulsion system 10.

The term "stationary portion" is used above to describe a portion of the nacelle 12 that is stationary during propulsion system 10 operation (e.g., during takeoff, aircraft flight and landing). However, the stationary portion may be otherwise movable for propulsion system 10 inspection/maintenance; e.g., when the propulsion system 10 is non-operational. Each of the fan cowls 24, for example, may be configured to provide access to components of the gas turbine engine such as the fan case 32 and/or peripheral equipment configured therewith for inspection, maintenance and/or otherwise. In particular, each of the fan cowls 24 may be pivotally mounted with the aircraft propulsion system 10 by, for example, a pivoting hinge system. The present disclosure, of course, is not limited to the foregoing fan cowl configurations and/or access schemes.

The aft structure 26 of FIG. 1 is disposed at the nacelle aft end 20. The aft structure 26 is configured to form a bypass nozzle 34 for the bypass flowpath with an inner structure 36 of the nacelle 12; e.g., an inner fixed structure (IFS). The aft structure 26 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 2:
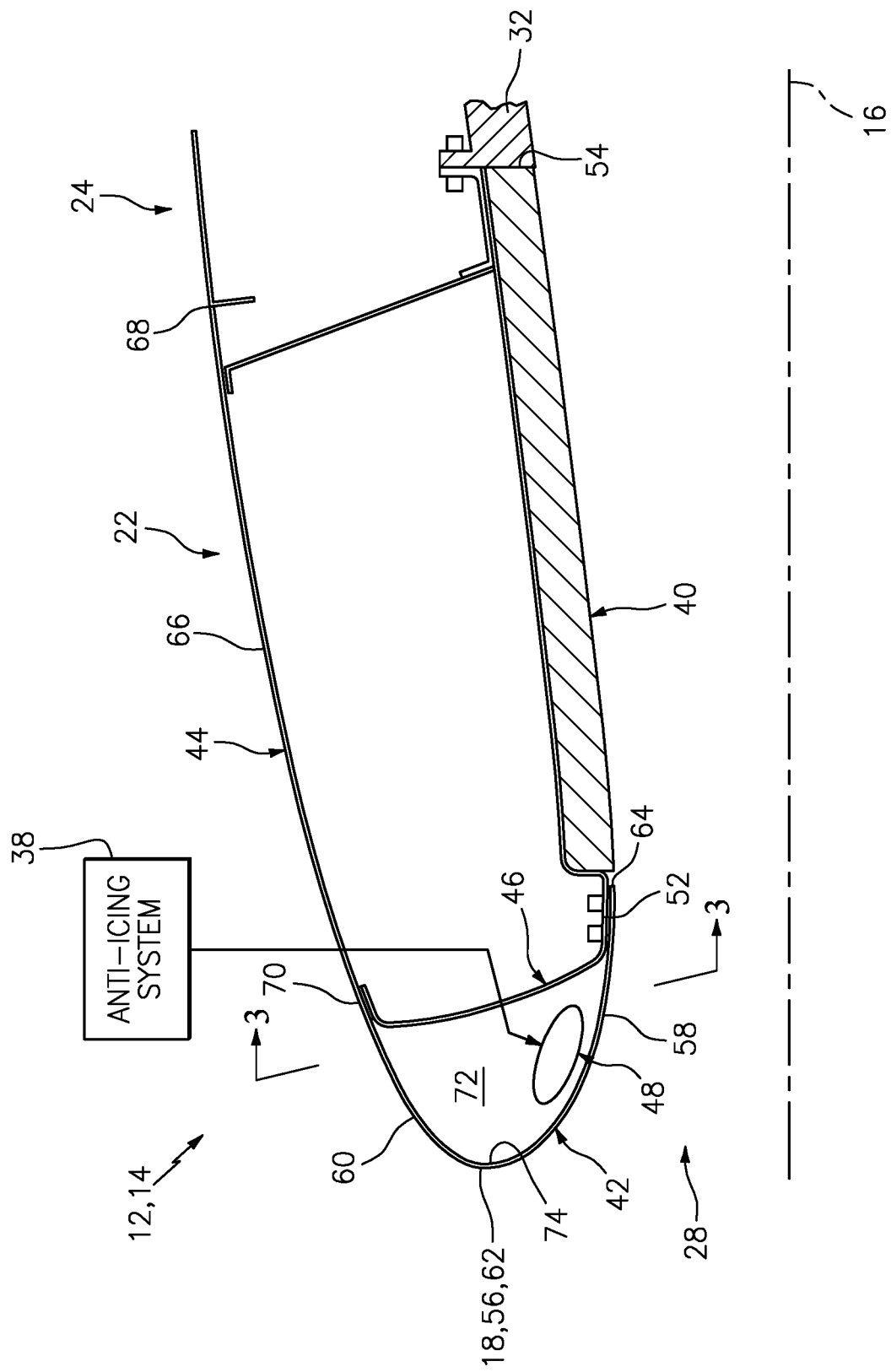
FIG. 2 is a partial side sectional illustration of a forward nacelle structure for the aircraft propulsion system.

FIG. 2 is a schematic side sectional illustration of an assembly of the propulsion system 10 of FIG. 1. This propulsion system assembly includes the inlet structure 22, the fan cowls 24 (one shown) and the fan case 32. The propulsion system assembly also includes a thermal anti-icing system 38, which may be configured to receive relatively hot compressed bleed air from a compressor section (e.g., a high pressure compressor (HPC) section or a low pressure compressor (LPC) section) of the gas turbine engine.

The inlet structure 22 in FIG. 2 includes a tubular inner barrel 40, an annular inlet lip 42, a tubular outer barrel 44 and at least one forward (e.g., annular) bulkhead 46. The inlet structure 22 also includes a piccolo tube 48 for the thermal anti-icing system 38 and a piccolo tube support structure 50 (shown in FIGS. 4-6).

The inner barrel 40 extends circumferentially around the axial centerline 16. The inner barrel 40 extends axially along the axial centerline 16 between an inner barrel forward end 52 and an inner barrel aft end 54.

The inner barrel 40 may be configured to attenuate noise generated during propulsion system 10 operation and, more particularly for example, noise generated by rotation of the fan. The inner barrel 40 of FIG. 2, for example, includes at least one tubular acoustic panel or an array of arcuate acoustic panels arranged around the axial centerline 16. Each acoustic panel may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 42 forms a leading edge 56 of the nacelle 12 as well as the inlet opening 28 to the gas path. The inlet lip 42 has a cupped (e.g., generally U-shaped) cross-sectional geometry, which extends circumferentially as an annulus around the axial centerline 16. The inlet lip 42 includes an inner lip skin 58 and an outer lip skin 60, which skins 58 and 60 may be formed together from a generally contiguous sheet material. Examples of such sheet material include, but are not limited to, metal (e.g., steel or aluminum (Al) or titanium (Ti) sheet metal) or composite material (e.g., fiber-reinforcement within a polymer matrix).

The inner lip skin 58 extends axially from an intersection 62 with the outer lip skin 60 at the nacelle forward end 18 to the inner barrel 40, which intersection 62 may be at an axially forwardmost point on the inlet lip 42. An aft end 64 of the inner lip skin 58 is attached to the forward end 52 of the inner barrel 40 with, for example, one or more fasteners; e.g., rivets, bolts, etc. The inner lip skin 58 may also or alternatively be bonded (e.g., welded, brazed, adhered, etc.) to the inner barrel 40. Of course, the present disclosure is not limited to any particular attachment techniques between the inlet lip 42 and the inner barrel 40.

The outer lip skin 60 extends axially from the intersection 62 with the inner lip skin 58 at the nacelle forward end 18 to the outer barrel 44.

The outer barrel 44 has a tubular outer barrel skin 66 that extends circumferentially around the axial centerline 16. The outer barrel skin 66 extends axially along the axial centerline 16 between the inlet lip 42 and, more particularly, the outer lip skin 60 and an aft end 68 of the outer barrel 44.

The outer barrel 44 and its skin 66 may be formed integrally with the outer lip skin 60 and, more particularly, the entire inlet lip 42 as shown in FIG. 2. The inlet lip 42 and the outer barrel 44, for example, may be formed from a monolithic skin such as, for example, a formed piece of sheet metal or molded (e.g., non-metallic) composite material; e.g., fiber reinforcement within a polymer matrix. Such a monolithic skin may extend longitudinally from the aft end 64 of the inner lip skin 58 to the aft end 68 of the outer barrel 44. This monolithic skin therefore integrally includes the inner lip skin 58, the outer lip skin 60 as well as the outer barrel skin 66. In such embodiments, the monolithic skin may be formed as a full hoop body, or circumferentially segmented into arcuate (e.g., circumferentially extending) bodies which are attached in a side-by-side fashion circumferentially about the axial centerline 16. The present disclosure, however, is not limited to such exemplary configurations. For example, in other embodiments, the inlet lip 42 may be formed discrete from the outer barrel 44 where the outer lip skin 60 is discrete from the outer barrel skin 66. In such embodiments, the outer lip skin 60 may meet the outer barrel skin 66 at an interface with the forward bulkhead 46 at, for example, a point 70.

The forward bulkhead 46 is configured with the inlet lip 42 to form a forward cavity 72 (e.g., annular D-duct) within the inlet lip 42. The forward bulkhead 46 of FIG. 2, in particular, is axially located approximately at (e.g., proximate, adjacent or on) the aft end 64 of the inlet lip 42. The forward bulkhead 46 may be configured as a substantially annular body, which may be continuous or circumferentially segmented. The forward bulkhead 46 is attached to and extends radially between the inner lip skin 58 and the outer lip skin 60. The forward bulkhead 46 may be mechanically fastened to the inlet lip 42 with one or more fasteners. The forward bulkhead 46 may also or alternatively be bonded and/or otherwise connected to the inlet lip 42.

Figure 3:
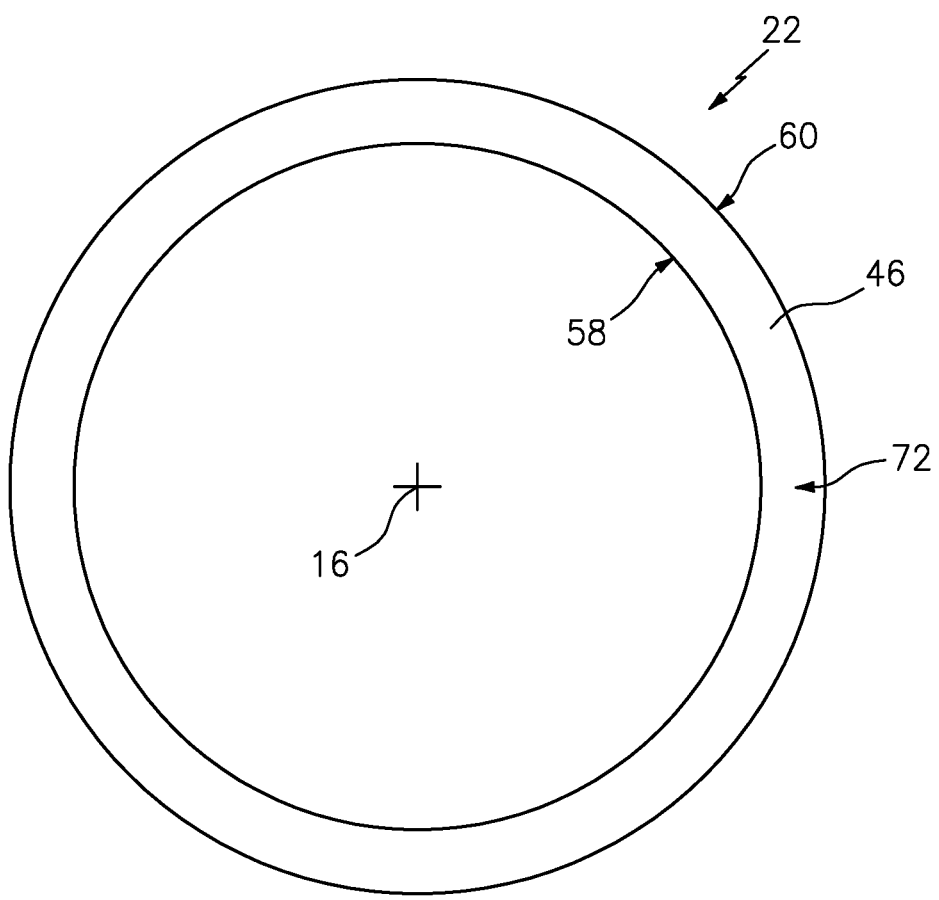
FIG. 3 is a front sectional illustration of the forward nacelle structure taken along line 3-3 in FIG. 2.

The cavity 72 extends axially within the inlet lip 42 from a forward end 74 of the inlet lip 42 (e.g., at the intersection 62) to the forward bulkhead 46. The cavity 72 extends radially within the inlet lip 42 from the inner lip skin 58 to the outer lip skin 60. Referring to FIG. 3, the cavity 72 also extends circumferentially about (e.g., completely around) the axial centerline 16.

Figure 4:
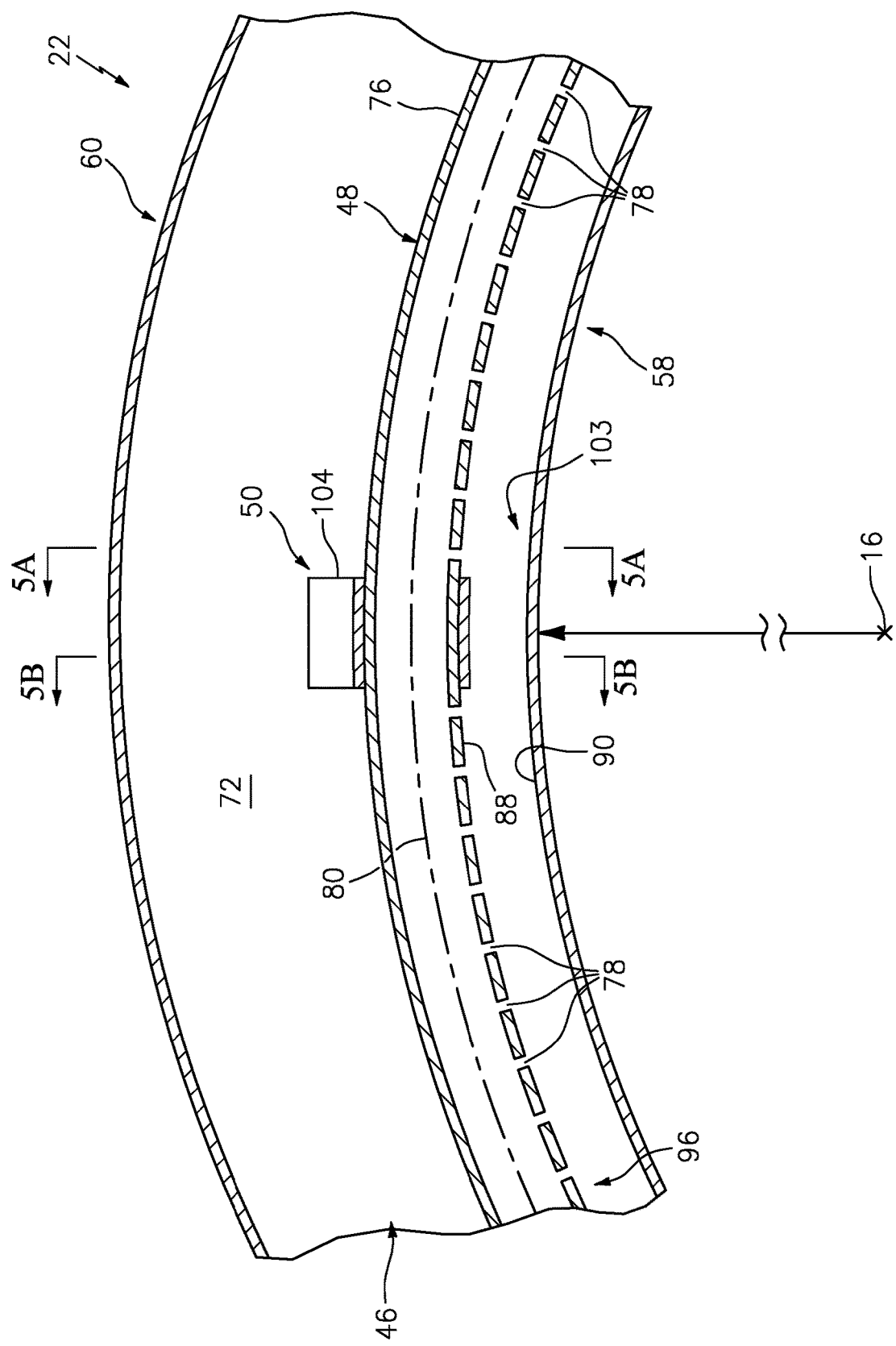
FIG. 4 is a partial front sectional illustration of the forward nacelle structure and, more particularly, is an enlarged view of a dashed rectangular region in the front sectional illustration of FIG. 6.
Figure 5A:
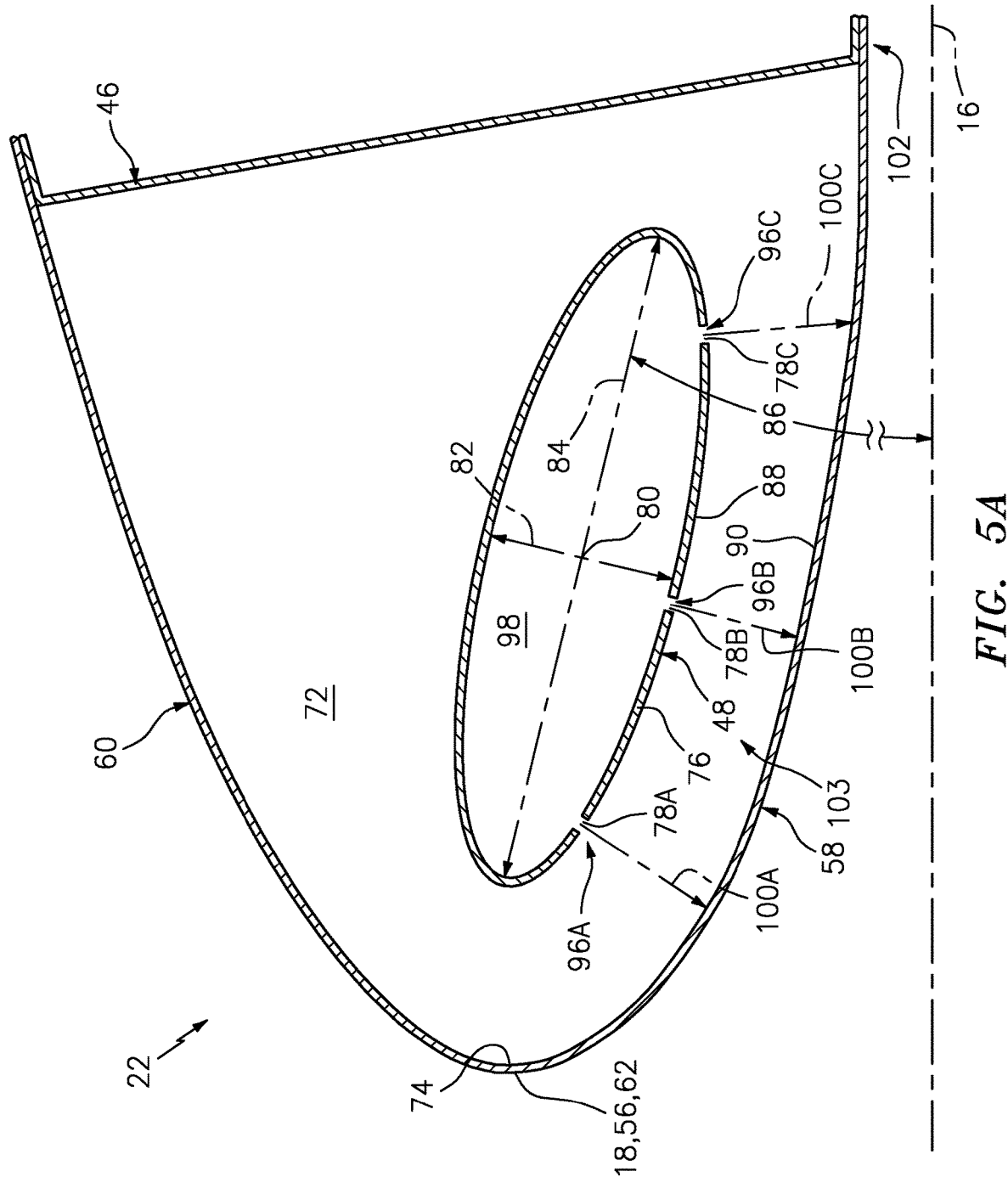
FIG. 5A is a side sectional illustration of the forward nacelle structure take along line 5A-5A in FIG. 4.

Referring to FIGS. 4 and 5A, the piccolo tube 48 is configured as a porous tubular body. The piccolo tube 48 of FIGS. 4 and 5A, for example, includes a tubular sidewall 76 with a plurality of (e.g., impingement) apertures 78A, 78B and 78C (generally referred to as "78") that extend through (e.g., pierce) the sidewall 76.

Figure 6:
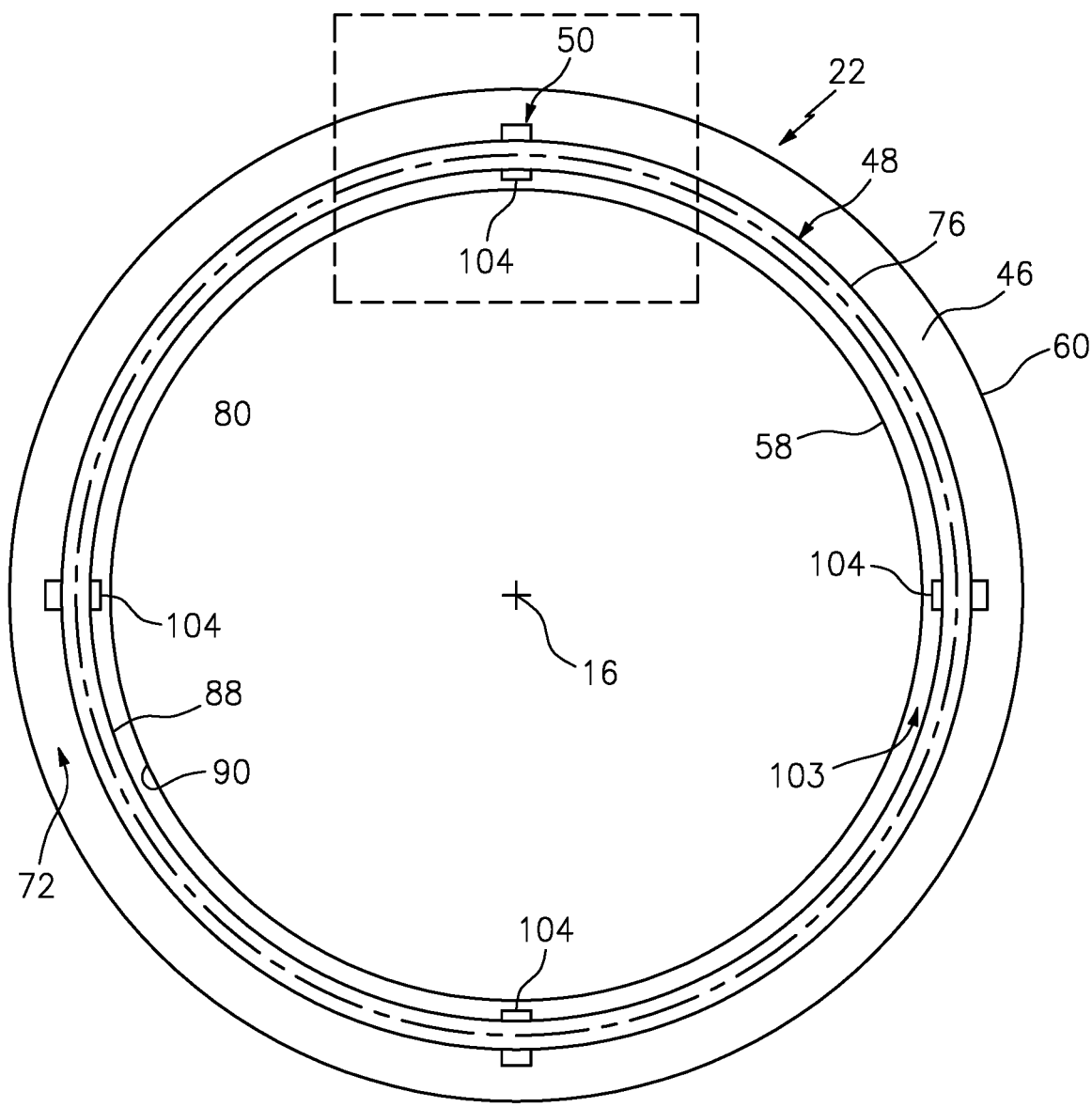
FIG. 6 is a front sectional illustration of the forward nacelle structure.

Referring to FIG. 6, the piccolo tube 48 and its sidewall 76 extend longitudinally along a curvilinear longitudinal centerline 80. This longitudinal centerline 80 extends circumferentially about the axial centerline 16 such that the piccolo tube 48 and its sidewall 76 also extend circumferentially about (e.g., completely around) the axial centerline 16. The piccolo tube 48 may thereby have a full hoop body.

Referring to FIG. 5A, the piccolo tube 48 is configured with a non-circular cross-sectional geometry when viewed, for example, in a plane. This plane may be parallel with and coincident with the axial centerline 16; e.g., see plane of FIG. 5A. The plane may also or alternatively be perpendicular to the longitudinal centerline 80; e.g., see the plane of FIG. 5A.

The non-circular cross-sectional geometry may have an elongated (e.g., symmetrical) shape such as, but not limited to, an elliptical shape. The non-circular cross-sectional geometry of FIG. 5A has a minor axis 82 and a major axis 84. The term "minor axis" may describe a minimum (shortest) diameter of an elongated shape such as an ellipse, which diameter extends through a center of the elongated shape. The term "major axis" may describe a maximum (longest) diameter of an elongated shape such as an ellipse, which diameter extends through a center of the elongated shape.

The piccolo tube 48 may be angled such that the major axis 84 is angularly offset from the axial centerline 16 by an angle 86; e.g., an acute angle. This angle 86 may be selected such that when the piccolo tube 48 is arranged within the cavity 72 as described below a curvature of an exterior surface 88 of the piccolo tube 48 substantially mirrors/follows a curvature of an interior surface 90 of the inlet lip 42 (e.g., the inner lip skin 58). Depending upon the specific curvature of the interior surface 90 of the inlet lip 42 and/or the specific placement of the piccolo tube 48 within the cavity 72, the angle 86 may be between one degree (1°) and forty-five degrees (45°); e.g., between five degrees (5°) and twenty-five degrees (25°), or between fifteen degrees (15°) and thirty-five degrees (35°), or between twenty degrees (20°) and forty degrees (40°). The present disclosure, of course, is not limited to the foregoing exemplary angle values.

Figure 7:
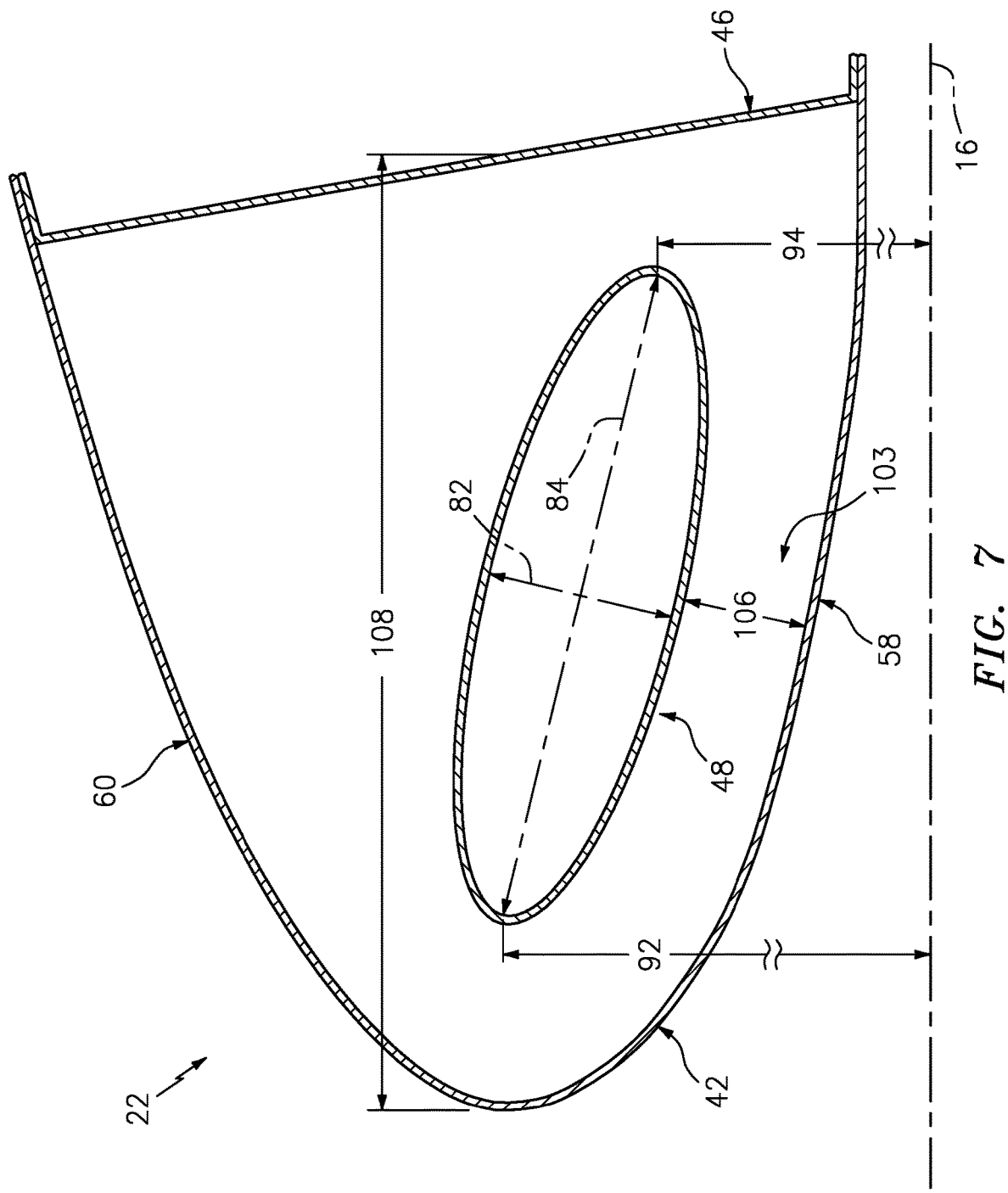
FIG. 7 is another side sectional illustration of the forward nacelle structure.

Referring to FIG. 7, a forward end of the major axis 84 has a first radius 92 to the axial centerline 16. An aft end of the major axis 84 has a second radius 94 to the axial centerline 16. The second radius 94 may be less than the first radius 92.

Referring to FIGS. 4 and 5A, the apertures 78 are arranged in one or more (e.g., annular) arrays 96A, 96B and 96C (generally referred to as "96"). Within each array 96, the apertures 78 are disposed circumferentially about the axial centerline 16. Referring to FIG. 5A, the arrays 96A-96C may be spaced along the axial centerline 16. With such a configuration, each aperture 78A in the forward array 96A is axially forward of the apertures 78B in the intermediate array 96B and the apertures 78C in the aft array 96C. Each aperture 78B in the intermediate array 96B is axially between the apertures 78A in the forward array 96A and the apertures 78C in the aft array 96C. Each aperture 78C in the aft array 96C is axially aft of the apertures 78B in the intermediate array 96B and the apertures 78A in the forward array 96A. Of course, while three arrays 96 of apertures 78 are shown in the drawings, the piccolo tube 48 may be configured with any other number (e.g., 1, 2, 4 or more) of aperture arrays 96 depending upon the requirements for the thermal anti-icing system 38.

Each of the apertures 78 is configured to direct a portion of fluid (e.g., heat air) flowing through an interior bore 98 of the piccolo tube 48 along a respective (e.g., straight line) trajectory 100A, 100B, 100C (generally referred to as "100") to a point on the interior surface 90 of the inlet lip 42. Each trajectory 100 may be perpendicular to the exterior surface 88 of the piccolo tube 48 at a point where the respective aperture 78 extends through the sidewall 76. The apertures 78 are thereby configured to facilitate impingement of the fluid against the interior surface 90.

Figure 8:
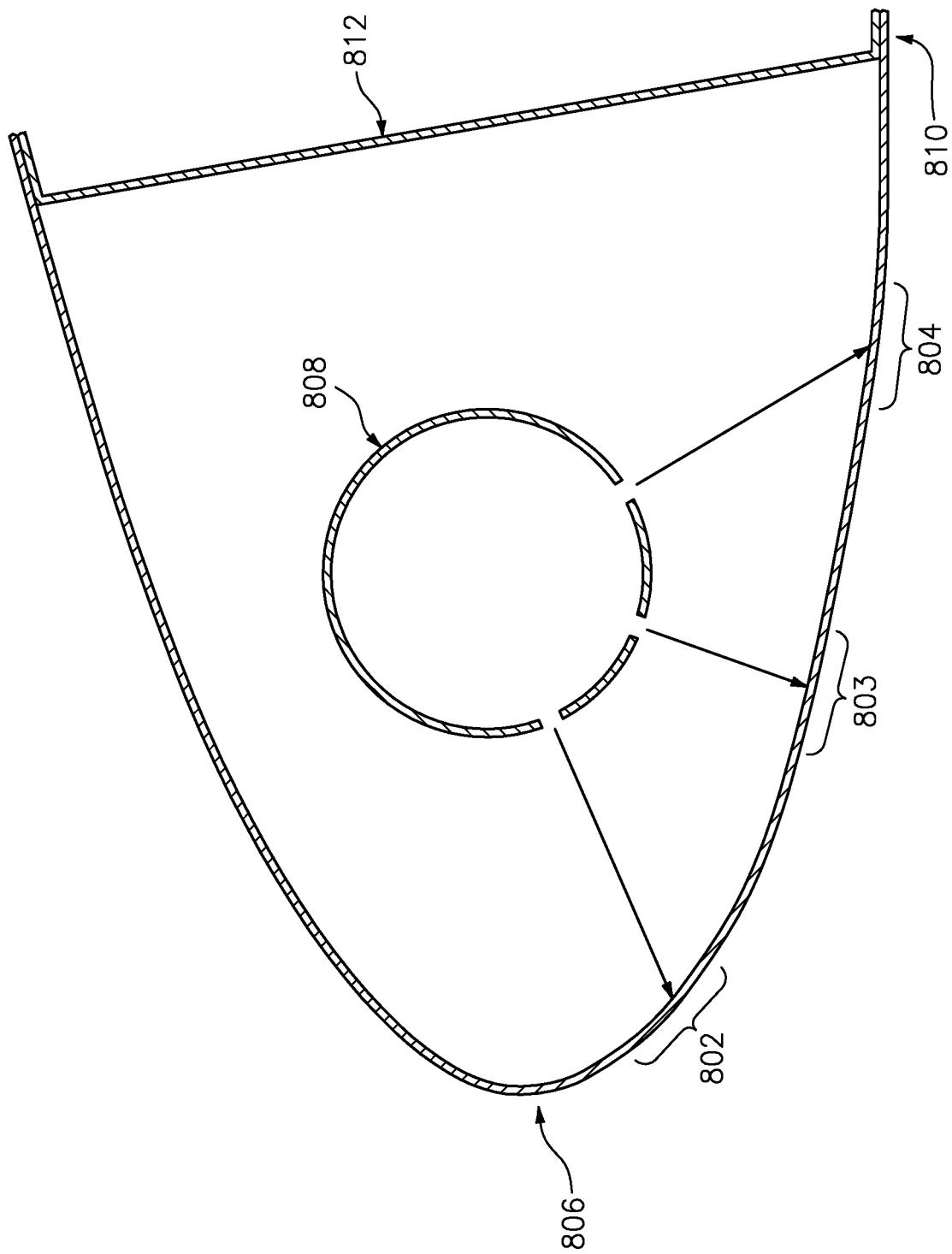
FIG. 8 is a side sectional illustration of another forward nacelle structure.

The piccolo tube 48 may be arranged in the cavity 72 and the apertures 78 may be arranged in the piccolo tube 48 such that, for example, impingement distances for each of the apertures 78 (or a subset of the apertures) are substantially equal; e.g., within +/−5% or +/−10%. For example, a distance between each forward aperture 78A and the interior surface 90 along a respective forward aperture trajectory 100A is substantially (e.g., within +/−5% or +/−10%) equal or exactly equal to (A) a distance between each intermediate aperture 78B and the interior surface 90 along a respective intermediate aperture trajectory 100B and/or (B) a distance between each aft aperture 78C and the interior surface 90 along a respective aft aperture trajectory 100C. With such an arrangement, forward, intermediate and aft portions of the inlet lip 42 may be substantially equally affected (e.g., heated) by the fluid impinging there-against. By contrast, referring to FIG. 8, corresponding portions 802-804 of an inlet lip 806 heated by a piccolo tube 808 with a circular cross-sectional geometry will be subjected to uneven heating. For example, the intermediate portion 803 may be heated more than the forward portion 802 and significantly more than the aft portion 804. In addition, the piccolo tube 808 of FIG. 8 may not adequately heat a joint 810 at a forward bulkhead 812. By contrast, given an extended axial length of the piccolo tube 48 of FIG. 5A, the piccolo tube 48 may be configured to provide more heating to a joint 102 at the bulkhead 46.

Figure 5B:
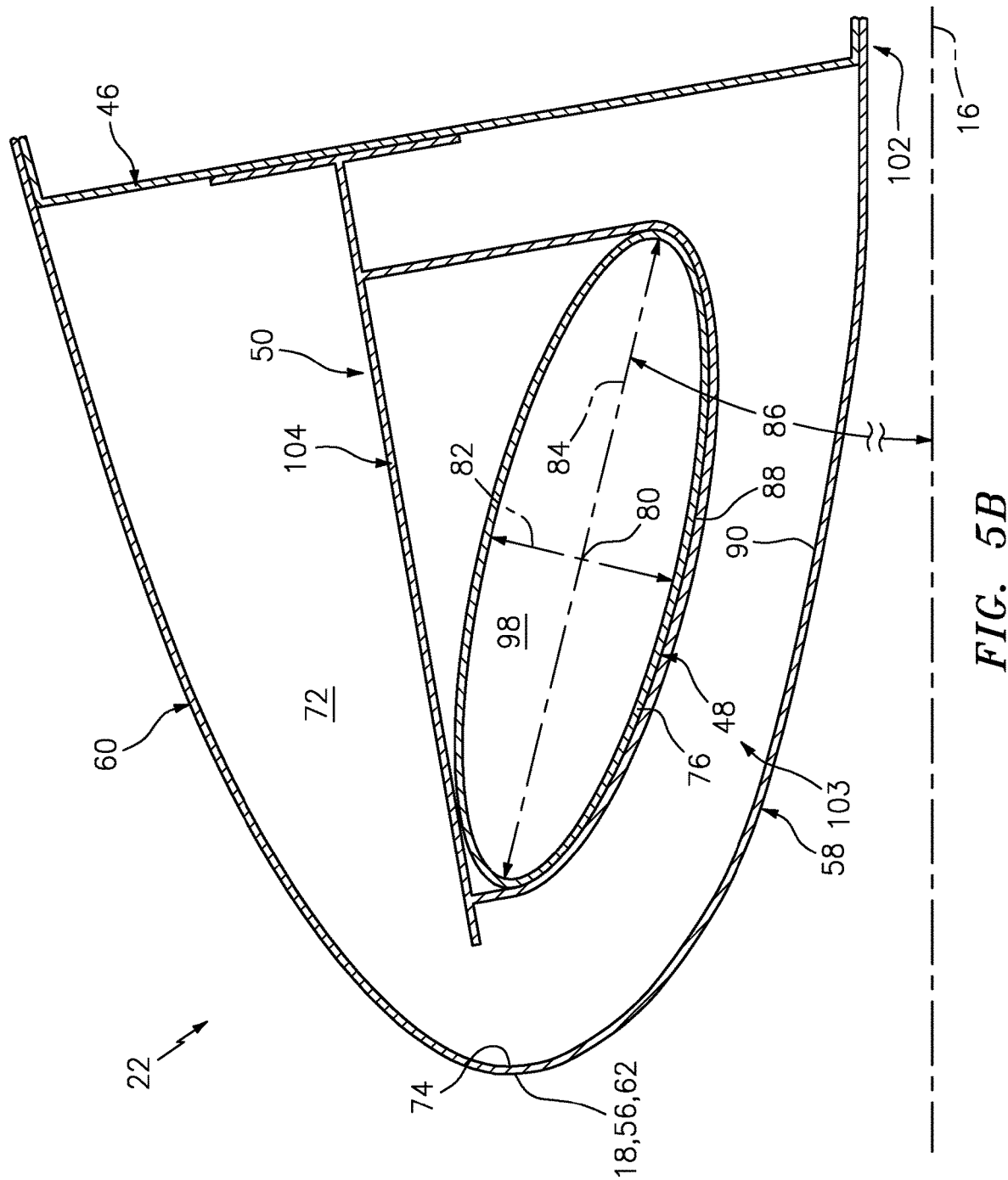
FIG. 5B is another side sectional illustration of the forward nacelle structure take along line 5B-5B in FIG. 4.

The piccolo tube support structure 50 of FIG. 5B is configured to mount the piccolo tube 48 to the bulkhead 46 in such a manner that, for example, the piccolo tube 48 is arranged discrete from the inlet lip 42. The piccolo tube 48 of FIG. 5B, for example, is (e.g., completely) separated from the inlet lip 42 by a (e.g., air) gap 103 (see also FIGS. 4 and 6). Such a separation prevents conduction between the piccolo tube 48 and the inlet lip 42. The separation also facilitates movement (e.g., mixing) of the air within the cavity 72 after impingement against the interior surface 90 of the inlet lip 42.

Referring to FIG. 6, the piccolo tube support structure 50 includes one or more mounting brackets 104. These mounting brackets 104 are arranged circumferentially about the axial centerline 16 such that each mounting bracket 104 supports a discrete circumferential portion of the piccolo tube 48. Referring to FIG. 5B, each mounting bracket 104 mounts the piccolo tube 48 to the forward bulkhead 46.

Referring to FIG. 7, in some embodiments, a minimum distance 106 between the piccolo tube 48 and the inlet lip 42 and, more particularly, a portion of the inner lip skin 58 that is axially overlapped by and/or radially below the piccolo tube 48 may be between fifty percent (50%) and one-hundred and fifty percent (150%) a value of the minor axis 82.

In some embodiments, a value of the major axis 84 may be at least fifty percent (e.g., between 50% and 90%) of a maximum axial distance 108 between the inlet lip 42 and the bulkhead 46.

Figure 9:
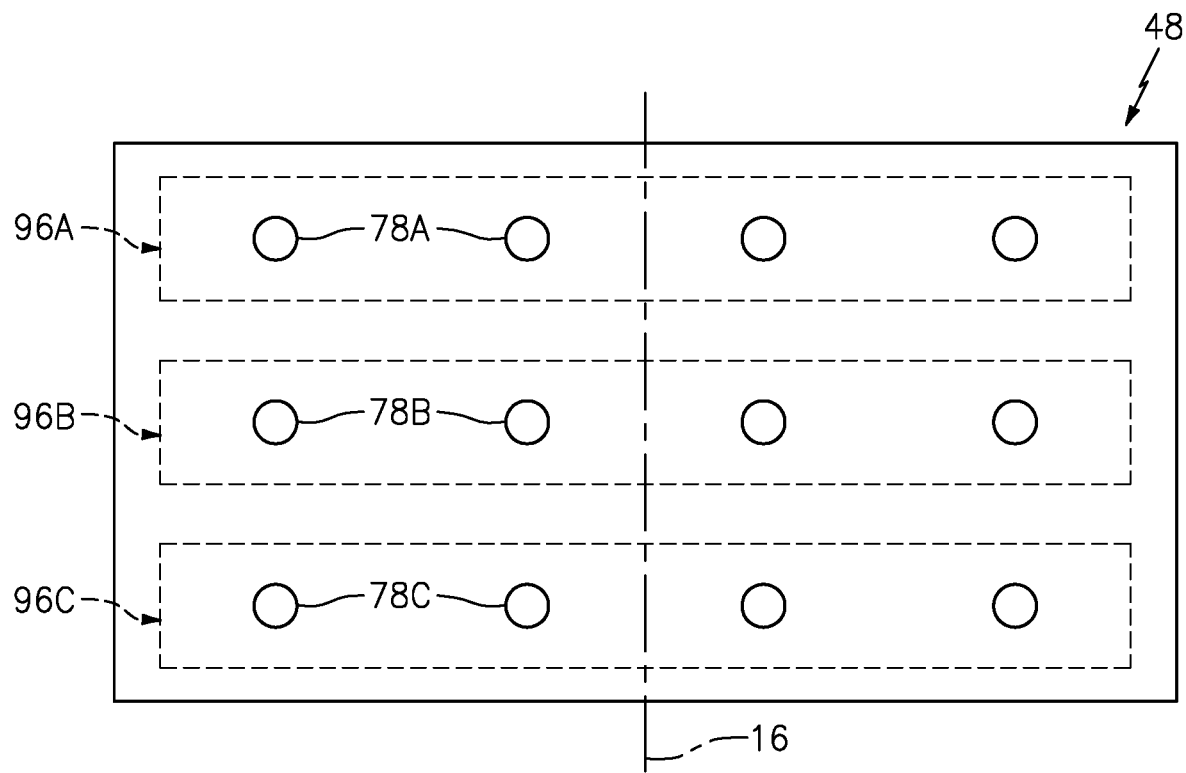
FIG. 9 is an illustration of a portion of a piccolo tube with a first pattern of apertures.
Figure 10:
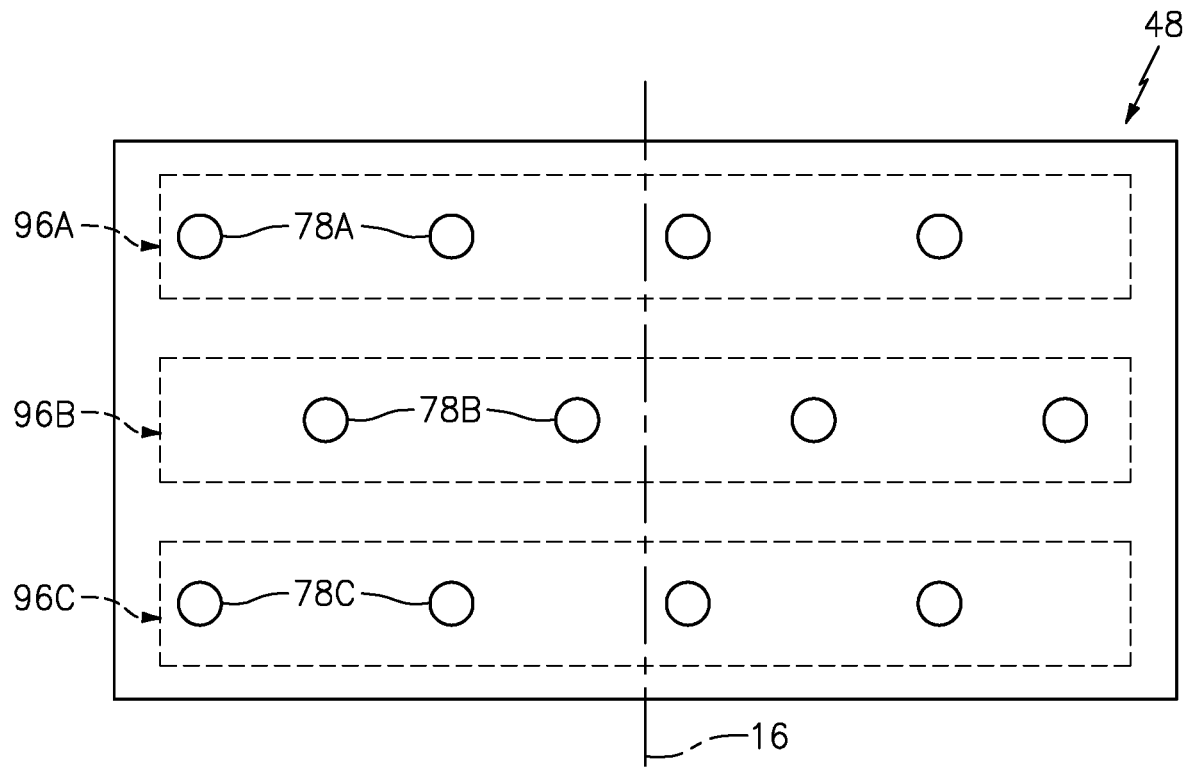
FIG. 10 is an illustration of a portion of the piccolo tube with a second pattern of apertures.

In some embodiments, referring to FIG. 9, the apertures 78 in one of the arrays 96 may be (e.g., circumferentially) aligned with at least some or all of the apertures 78 in one or more of the other arrays 96; e.g., at least an axially adjacent array 96 or each of the other arrays 96. For example, each aperture 78B in the array 96B of FIG. 9 is circumferentially aligned about the centerline 16 with a respective (e.g., closest) aperture 78A, 78C in the axially (e.g., closest) neighboring array(s) 96A, 96C. In other embodiments, referring to FIG. 10, the apertures 78 in one of the arrays 96 may be (e.g., circumferentially) offset from/staggered relative to at least some or all of the apertures 78 in one or more of the other arrays 96; e.g., at least an axially adjacent array 96. For example, each aperture 78B in the array 96B of FIG. 10 is circumferentially offset from each aperture 78A, 78C in the axially (e.g., closest) neighboring array(s) 96A, 96C about the centerline 16. In addition, while the apertures 78A and 78C in the arrays 96A and 96C of FIG. 10 are circumferentially aligned about the centerline 16, in other embodiments those apertures 78A and 78C may alternatively be circumferentially offset from one another.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A system for an aircraft propulsion system, comprising:
an inlet lip extending circumferentially about an axial centerline;
a bulkhead extending circumferentially about the axial centerline, the bulkhead configured with the inlet lip to form a cavity axially between the inlet lip and the bulkhead; and
a piccolo tube for a thermal anti-icing system, the piccolo tube extending circumferentially about the axial centerline within the cavity, and the piccolo tube configured with an elliptical cross-sectional geometry;
wherein the elliptical cross-sectional geometry has a major axis and a minor axis; and wherein the major axis is angularly offset from the axial centerline by an acute angle.

2. The system of claim 1, further comprising a mounting bracket attaching the piccolo tube to the bulkhead.

3. The system of claim 1, wherein the piccolo tube is completely separated from the inlet lip by a gap.

4. The system of claim 1, wherein the acute angle is between one degree and forty-five degrees.

5. The system of claim 1, wherein
a forward end of the major axis has a first radius to the axial centerline; and
an aft end of the major axis has a second radius to the axial centerline that is less than the first radius.

6. The system of claim 1, wherein the piccolo tube is configured with a plurality of impingement apertures configured to direct fluid from within the piccolo tube to impinge against the inlet lip.

7. The system of claim 6, wherein
a first set of the plurality of impingement apertures are arranged in a first array;
a second set of the plurality of impingement apertures are arranged in a second array that is axially offset from the first array; and
a first of the plurality of impingement apertures in the first set is circumferentially offset from each of the plurality of impingement apertures in the second set.

8. The system of claim 6, wherein a first of the plurality of impingement apertures is circumferentially aligned with and axially offset from a second of the plurality of impingement apertures.

9. The system of claim 6, wherein
the plurality of impingement apertures comprise a first impingement aperture and a second impingement aperture axially aft of the first impingement aperture along the axial centerline;
the first impingement aperture is configured to direct a first portion of the fluid to impinge against the inlet lip along a first trajectory;
the second impingement aperture is configured to direct a second portion of the fluid to impinge against the inlet lip along a second trajectory; and
a first distance between the first impingement aperture and the inlet lip along the first trajectory is within +/−5% a second distance between the second impingement aperture and the inlet lip along the second trajectory.

10. The system of claim 9, wherein
the plurality of impingement apertures further comprise a third impingement aperture axially between the first impingement aperture and the second impingement aperture along the axial centerline;
the third impingement aperture is configured to direct a third portion of the fluid to impinge against the inlet lip along a third trajectory; and
a third distance between the third impingement aperture and the inlet lip along the third trajectory is within +/−5% the second distance between the second impingement aperture and the inlet lip along the second trajectory.

11. A system for an aircraft propulsion system, comprising:
an inlet lip extending circumferentially about an axial centerline;
a bulkhead extending circumferentially about the axial centerline, the bulkhead configured with the inlet lip to form a cavity axially between the inlet lip and the bulkhead; and
a piccolo tube for a thermal anti-icing system, the piccolo tube extending circumferentially about the axial centerline within the cavity, and the piccolo tube configured with an elliptical cross-sectional geometry;
wherein the elliptical cross-sectional geometry has a major axis and a minor axis; and
wherein a minimum distance between the piccolo tube and the inlet lip is between 50-150% of the minor axis.

12. A system for an aircraft propulsion system, comprising:
an inlet lip extending circumferentially about an axial centerline;
a bulkhead extending circumferentially about the axial centerline, the bulkhead configured with the inlet lip to form a cavity axially between the inlet lip and the bulkhead; and
a piccolo tube for a thermal anti-icing system, the piccolo tube extending circumferentially about the axial centerline within the cavity, and the piccolo tube configured with an elliptical cross-sectional geometry;
wherein the elliptical cross-sectional geometry has a major axis and a minor axis; and
wherein the major axis is at least 50% of a maximum axial distance between the inlet lip and the bulkhead.

* * * * *